United States Patent [19]

Perazzi

[11] Patent Number: 4,884,920
[45] Date of Patent: Dec. 5, 1989

[54] SET OF CONSTRUCTION ELEMENTS

[76] Inventor: Edgar Perazzi, CD 79 Laval, 06220 Greolieres, France

[21] Appl. No.: 266,206

[22] Filed: Oct. 27, 1988

Related U.S. Application Data

[63] Continuation of Ser. No. 933,541, Nov. 21, 1986, abandoned.

[30] Foreign Application Priority Data

Nov. 27, 1985 [FR] France .............................. 85 16630

[51] Int. Cl.⁴ .............................................. E02D 29/02
[52] U.S. Cl. ........................................ 405/284; 47/33; 52/586; 52/608
[58] Field of Search .............................. 405/284, 273; D25/113–117; 404/41; 52/586, 608, 609, 282; 47/32, 33

[56] References Cited

U.S. PATENT DOCUMENTS

| 947,290 | 1/1910 | Bates | 52/590 |
| 4,012,881 | 3/1977 | Martiradonna | 52/604 |
| 4,229,123 | 10/1980 | Heinzmann | 405/273 |
| 4,262,467 | 4/1981 | Faisant et al. | 52/590 |

FOREIGN PATENT DOCUMENTS

| 2415782 | 10/1975 | Fed. Rep. of Germany | 52/608 |
| 3101148 | 8/1982 | Fed. Rep. of Germany | |
| 3322110 | 12/1984 | Fed. Rep. of Germany | 405/286 |
| 928401 | 11/1947 | France | |
| 1261075 | 12/1961 | France | 52/608 |
| 2307083 | 11/1976 | France | 404/41 |
| 2428786 | 1/1980 | France | |
| 2545128 | 11/1984 | France | |
| 2077796 | 12/1981 | United Kingdom | 52/561 |

Primary Examiner—John E. Murtagh

[57] ABSTRACT

The invention is a set of construction elements in which each element is open-ended and comprises four identical wall sections. Each wall section is a quarter cylinder. The elements have two basic forms; one in which the four wall sections are disposed outwardly convex, and the element is an open-ended cylinder; and the other in which the four wall sections are disposed outwardly concave, and the element has a curvilinear square section. Horizontal rows are constructed by alternately arranging the cylindrical and curvilinear square elements. Walls are erected by superposing horizontal rows. The superposed rows can be offset relative to one another, and the thus-exposed open tops of the rows filled with soil to serve as flower beds. Preferably, each element has vertical channels formed on the exterior surface of the wall sections, in which connecting rods can be seated so as to interconnect adjacent horizontal and vertical elements.

12 Claims, 2 Drawing Sheets

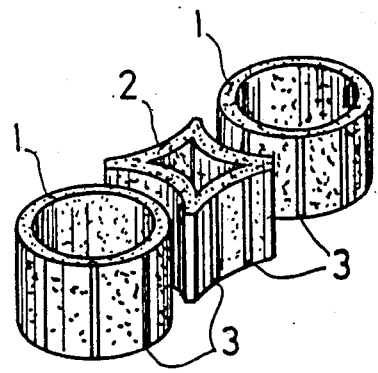
Fig_1
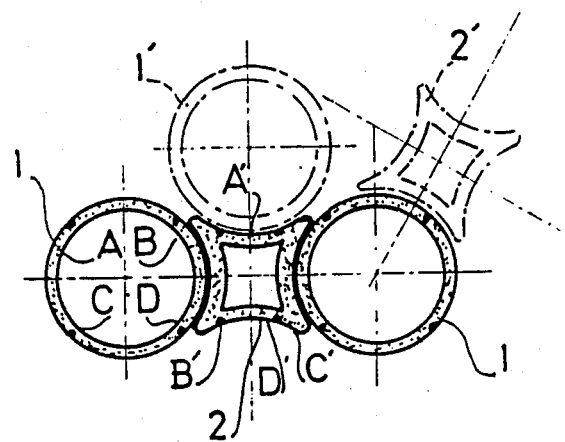
Fig_1'

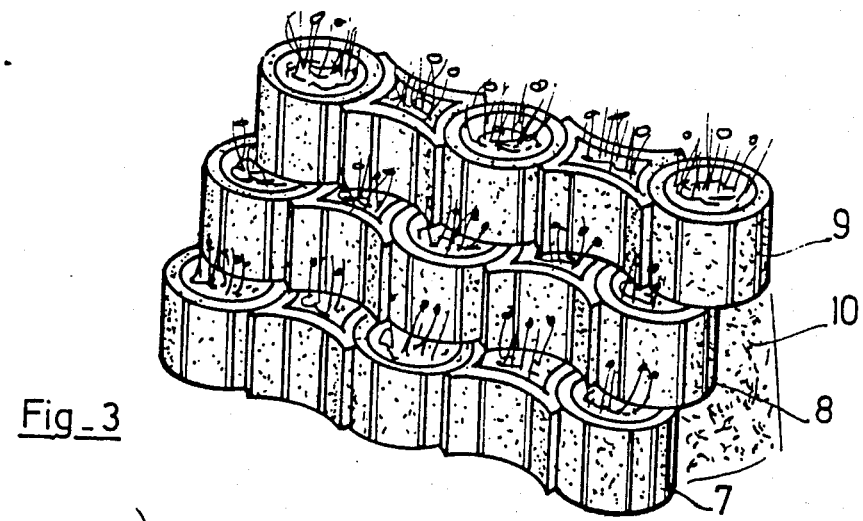
Fig_3
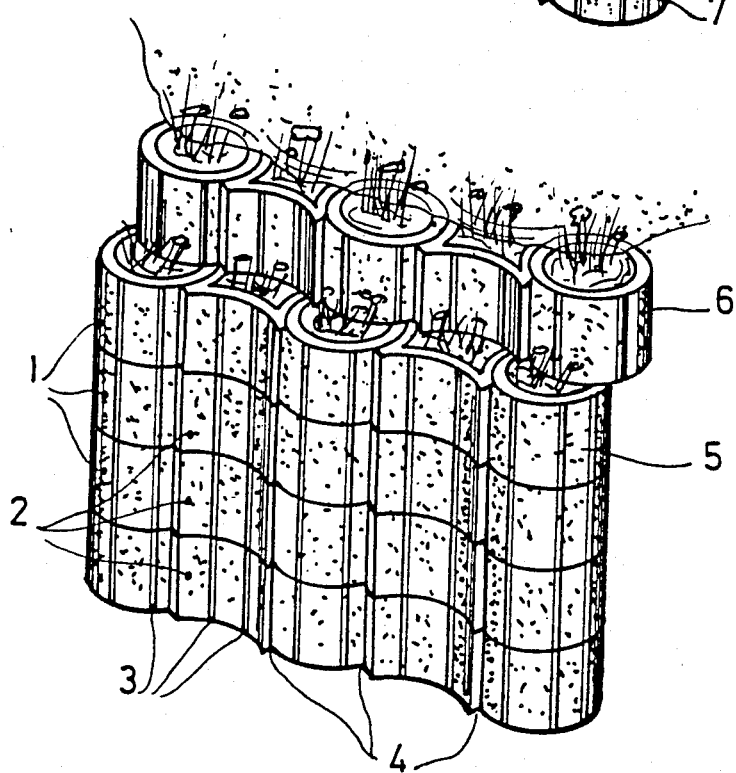
Fig_2

SET OF CONSTRUCTION ELEMENTS

This application is a continuation of my application serial number 933,541, filed Nov. 21, 1986, now abandoned.

The present invention concerns a novel set of versatile construction elements, permitting, according to their various combinations, the production of more varied structures, from vertical or slanting retaining walls to columns with capitals and/or pedestals.

These elements consist essentially of hollow blocks each delimited by four walls in the shape of equal quarters of a circle, so disposed that they are convex, in which case the element is cylindrical, or concave, in which case the element is a curvilinear square, or possibly mixed. Preferably, the external wall of these elements comprises vertical channels, the function of which will be discussed further on. The material from which these elements are made is preferably colored concrete, as will also be discussed further on in connection with aesthetic aspects of the invention.

From a technical point of view, these elements are assembled in a ratio of one to four concave walls about an equal number of convex; thus, linear series formed from an alternating succession of convex and concave elements can be constructed. Such rows can then be superposed, either vertically or offset from one another the length of an embankment, to produce a vertical or slanted wall. In this latter case, the upper surface of each row remaining exposed, the elements may be filled with soil and play the role of flower beds. The rows in question may themselves be rectilinear, angular or arcuate so as to constitute walls having a corresponding configuration.

According to these various possibilities, a wall may also comprise a vertical portion and an upper portion that is offset to form flower bed, or also individual elements may be superposed to form columns, it being understood that in any case the various elements could be manufactured in various dimensions according to the combinations which will be used.

The invention will now be described with reference to the accompanying drawings, in which:

FIG. 1 shows in perspective the two basic elements according to the invention;

FIG. 1' shows in section various assemblies of these basic elements;

FIG. 2 shows the construction of a decorative vertical retaining wall; and

FIG. 3 shows the construction of a slanted retaining wall.

Referring first to FIGS. 1 and 1', it is seen that each element according to the invention is composed of four walls of equal quarter circles, either convex A, B, C, D, or concave A', B', C', D'. In the case of convex walls, the corresponding element 1 is a cylinder. In the case of concave walls, the corresponding element 2 has a curvilinear square section.

The equality of the quarter circles A-A'-B-B'-C-C'-D-D' permits associating them two-by-two, either linearly as shown, or angularly, as in 1-2-1', or in a curve, as in 2-1-2'.

Each element comprises vertical channels 3, which, between their decorative opposite extremities may serve to maintain a stack of identical elements by means of metallic rods housed in these channels. This is thus the case for the wall of FIG. 3 where rectilinear rows of elements 1-2-1-2 . . . are vertically stacked on one another, and rest generally on a foundation of reinforced concrete. These elements are filled with soil or possibly reinforced concrete and their inherent weight generally suffices to insure their steadiness. When needed, metallic rods 4 are placed in certain alignments of channels 3 to consolidate this wall.

Such a wall serves as a conventional retaining wall. If it is desired in addition to impart to it a decorative function, the upper row 5 of elements, filled with soil, can constitute a flower bed; the decorative effect is also enhanced by a supplementary row 6, offset with respect to the preceding row.

This mechanical and decorative dual function is exploited in the steep regions, where, as shown in FIG. 3, all these successive rows 7, 8, 9 . . . are offset and positioned against an embankment 10 so as to constitute a slanting wall serving at the same time as a decoration of the said embankment. Such an application may be exploited for the management of beaches, where imaginative effects may be added by the use of elements having different dimensions.

Generally speaking, these elements may be made from concrete, preferably coloured corresponding to the surrounding area, for example, ocher, reddish or white.

Besides the walls, decorative or purely functional, and the various enclosure means that can be produced with these elements, they may also be applied to the construction of columns with or without pedestals and capitals, or to any constructions such as support poles for basements.

It will be understood, according to the envisioned combinations, that elements having a different shape but corresponding to the same definition, for example comprising three convex faces and one concave, or alternatively one convex and one concave could always be interassembled along a quarter circle.

What is claimed is:

1. A structural wall comprising vertically stacked horizontal rows each comprised of alternating first and second hollow construction elements of respective first and second sets of identical elements with said first and second construction elements of said rows being stacked in columns of said first and second elements respectively, each of said elements of said rows being contiguous with each adjacent element of the row, said first set of alternate construction elements each having a circular convexly curved outer wall extending around the element, and said second set of alternating elements each having four concavely curved vertical walls the chordal planes of which extend along the sides of a rectangular solid with each of the walls being concave on the exterior and having substantially the same curvature as the convexly curved elements of the said first set of construction elements to provide for relative angular position movement between the contiguous elements of a row to accommodate angular relationships between adjacent portions of the wall, said concave surfaces of said second set of elements extending for about a quarter circle, each of said elements of said first and second sets have spaced vertical grooves in the outer walls thereof which are aligned in said columns and tie rods in respective aligned grooves of a column interconnecting the elements of the column.

2. A family of construction elements for building a vertical wall-like structure comprising first and second sets respectively comprised of identical first and identical second construction elements to be vertically stacked in horizontal rows with each row to be comprised of alternating first and second construction elements with said first and second construction elements of said rows stacked in vertical columns of the first and second elements with each of the elements of the rows being contiguous with each adjacent element of the row, said first construction elements each having a vertical opening therethrough and having a circular convexly curved outer wall extending around the element, and said second construction elements each having a vertical opening therethrough and four concavely curved vertical walls the chordal planes of which extend along the sides of a rectangular solid with each of the walls being concave on the exterior face and having substantially the same curvature as the convexly curved elements of the said first set of construction elements to provide for relative angular positioning movement between the contiguous elements of a row to accommodate angular relationships between adjacent portions of the wall, each of said concave surfaces of said second set of elements extend for about a quarter circle and said elements of said first and second sets have spaced vertical grooves in the outer walls thereof which are which are alignable in said columns to receive tie rods for interconnecting the elements of the column.

3. A family of construction elements for building a wall structure comprising first and second sets respectively comprises of identical first and identical second construction elements to be arranged in horizontal rods which are stacked upwardly one on another with each row to be comprised of alternating first and second construction elements with said first and second construction elements of said rows stacked one on another to provide respective stacks of the first and second elements with each of the elements of the rows being contiguous with each adjacent element of the row, said construction elements each having a vertical opening therethrough and each of the outer sides of the construction elements of said first and second sets having substantially circularly curved outer walls with the outer walls of the elements of each of said first and second sets having outer faces of curvature of corresponding faces on the other set of elements, one of the with one of each the corresponding faces being convex and the other concave to provide for relative angular positioning movement between the contiguous elements of a row for accommodating different angular relationships between adjacent portions of a wall, said elements having vertical grooves in the outer wall surfaces thereof for receiving tie rods for securing the elements in their respective stacks.

4. A family of construction elements as defined in claim 3 in which said first construction elements each have a circular convexly curved outer wall extending around the element to define four outer faces, and said second construction elements each has four concavely curved vertical outer faces the chordal planes of which extend along the sides of a rectangular solid.

5. A family of construction elements as defined in claim 3 in which said vertical grooves comprise spaced grooves which are alignable in said stacks of elements to receive tie rods for interconnecting the elements of a stack.

6. A wall structure comprised of a family of construction elements as defined in claim 3 with the elements of said first and second sets being alternately arranged in horizontal rows in contiguous relationship with each other with said rows being stacked one on another with each of the elements of said first and second sets being stacked respectively on another element of the set in the next lower row, and tie rods received in ones of said vertical grooves of said stacked elements for tieing the element in a stacked position.

7. A wall structure comprised of a family of construction elements as defined in claim 6 in which said first construction elements each have a circular convexly curved outer wall extending around the element which define four circularly curved outer faces, and said second construction elements each have four concavely curved vertical outer faces the chordal planes of which extend along the sides of a rectangular solid with each of the faces being concave, and tie rods received in vertical grooves of stacked elements for tieing the elements in a stacked position.

8. A wall structure comprised of a family of construction elements as defined in claim 6 in which said vertical grooves comprise spaced grooves which are aligned in said columns and have tie rods received therein for interconnecting the elements of a stack.

9. A family of construction elements as defined in claim 3 in which each of the said outer faces of each of said construction elements extend for substantially a quarter circle to substantially enclose the element.

10. A family of construction elements as defined in claim 5 in which each of the said outer faces of each of said construction elements extend for substantially a quarter circle to substantially enclose the element.

11. A wall structure as defined in claim 6 in which each of the said outer faces of each of said construction elements extend for substantially a quarter circle to substantially enclose the element.

12. A wall structure as defined in claim 8 in which each of the said outer faces of each of said construction elements extend for substantially a quarter circle to substantially enclode the element.

* * * * *